United States Patent
Chang

(10) Patent No.: US 6,956,986 B2
(45) Date of Patent: Oct. 18, 2005

(54) METHOD FOR ELIMINATING THE NOISE OF OPTICAL SWITCH

(75) Inventor: Chii-How Chang, Taoyuan (TW)

(73) Assignee: Delta Electronics, Inc., Taoyuan Hsien (TW)

(*) Notice: Subject to any disclaimer, the term of this patent is extended or adjusted under 35 U.S.C. 154(b) by 243 days.

(21) Appl. No.: 10/412,095

(22) Filed: Apr. 9, 2003

(65) Prior Publication Data

US 2004/0114855 A1 Jun. 17, 2004

(30) Foreign Application Priority Data

Dec. 16, 2002 (TW) ........................... 91136341 A

(51) Int. Cl.⁷ ................................................. G02B 6/35
(52) U.S. Cl. ............................. 385/16; 385/19; 385/23
(58) Field of Search ........................................ 385/16–24

(56) References Cited

U.S. PATENT DOCUMENTS

| | | | |
|---|---|---|---|
| 5,052,777 A | * | 10/1991 | Ninnis et al. ............... 385/19 |
| 5,067,787 A | * | 11/1991 | Gillham et al. ............. 385/50 |
| 6,388,789 B1 | * | 5/2002 | Bernstein .................... 359/198 |
| 2003/0228090 A1 | * | 12/2003 | Chu et al. .................... 385/18 |

* cited by examiner

Primary Examiner—John D. Lee
Assistant Examiner—Kevin S. Wood
(74) Attorney, Agent, or Firm—Birch, Stewart, Kolasch & Birch, LLP

(57) ABSTRACT

The invention provides a method for eliminating the noise of an optical switch, wherein the optical switch includes a cantilever, a flexible coupler and a joint. The joint is designed to connect the cantilever and the flexible coupler so as to perform a phase conversion by the cantilever. The method for eliminating the noise of the optical switch includes a step of damping generation so that the vibration of the cantilever can be eliminated during the phase conversion.

10 Claims, 2 Drawing Sheets

METHOD FOR ELIMINATING THE NOISE OF OPTICAL SWITCH

BACKGROUND OF THE INVENTION

1. Field of the Invention

The invention relates to a method for eliminating the noise of an optical switch and, more particularly, to a method for eliminating the noise of an optical switch, which employs an electromagnetic relay as a driver to perform a phase conversion

2. Description of the Related Art

An optical switch is a device capable of switching the light from an input terminal to a destination output terminal; that is, it has a function of switching the path of transmitting light. A conventional optical switch is mostly formed by assembling at least one light input/output device and at least one driver, wherein the at least one light input/output device is an optical component for switching incident light transmission path, whereas the driver performs a phase conversion to drive the light input/output component so that the light can be outputted to its destination output terminal in order to achieve switching light transmission path.

More specifically, as shown in FIG. 1, a common optical switch employs an electromagnetic relay as a driver. Usually, a plurality of limit switches 21, 22, 23 and 24 are provided inside the electromagnetic relay to instruct the relay to switch to its indicated phase. In addition, the optical switch includes a plurality of pin components 17 for use in circuitry, a cantilever 12 which is an activating component utilizing magnetic force to perform the phase conversion, a joint 15 for connecting the cantilever 12 and the flexible coupler 14, and an optical component 11 disposed at the front end of the arm 121. Furthermore, the antilever 12 is formed by joining an arm 121 to a cantilever sheet 122 by means of glue, laser welding, soldering or other methods, and the optical component 11 can be a lens, prism, wedged prism, or plate glass. However, since the optical component 11 has a certain weight and the arm 121 has a certain length, and the flexible coupler is made of metal sheet or plastic sheet, so that the arm 121 and the optical component 11 will generate a strong vibration when the relay is performing a phase conversion. Consequently, after the incident light has passed through the optical component 11, there is no way to form a fixed refraction orientation. Therefore, the orientation of the refracted outputted light cannot be stable, which often results in an optical insertion loss that is an unstable noise, as shown in FIG. 2. As a result, the phase will often be misjudged, and the lifespan of the relay will also be shortened.

Therefore, it is an important issue to eliminate the vibration generated by the relay during the phase conversion so that the noise of the optical switch can be eliminated as well as the lifespan of the relay can be prolonged.

SUMMARY OF THE INVENTION

In viewing the above problems, the invention provides a method for eliminating the noise of an optical switch, including a step of generating damping to add silica gel or other gel (such as UV refrigerant, AB refrigerant or heat refrigerant) or grease that has the quality of damper to the peripheral of the flexible coupler in order that when the optical switch is performing a phase conversion. Therefore, the vibration of the relay during the phase conversion can be eliminated by means of increasing the damping of the flexible coupler. As a result, after the incident light has passed through the optical component, a fixed deflection angle formed by the emergence light will be generated, consequently, the optical switch will generate no noise. Thus, not only can the invention prevent from misjudging the phase of the optical switch, but the lifespan of the relay can also be prolonged. Similarly, the material cost can be lowered, and the manufacturing method can be simplified as well.

As to the manufacturing method of the optical switch, the method applied by the invention can eliminate the noise of optical signal and prolong the lifespan of the relay by employing low-cost material and easy manufacturing method in a manner that the optical performance of the optical switch will not be affected.

DESCRIPTION OF THE PREFERRED EMBODIMENTS

Figure 1:
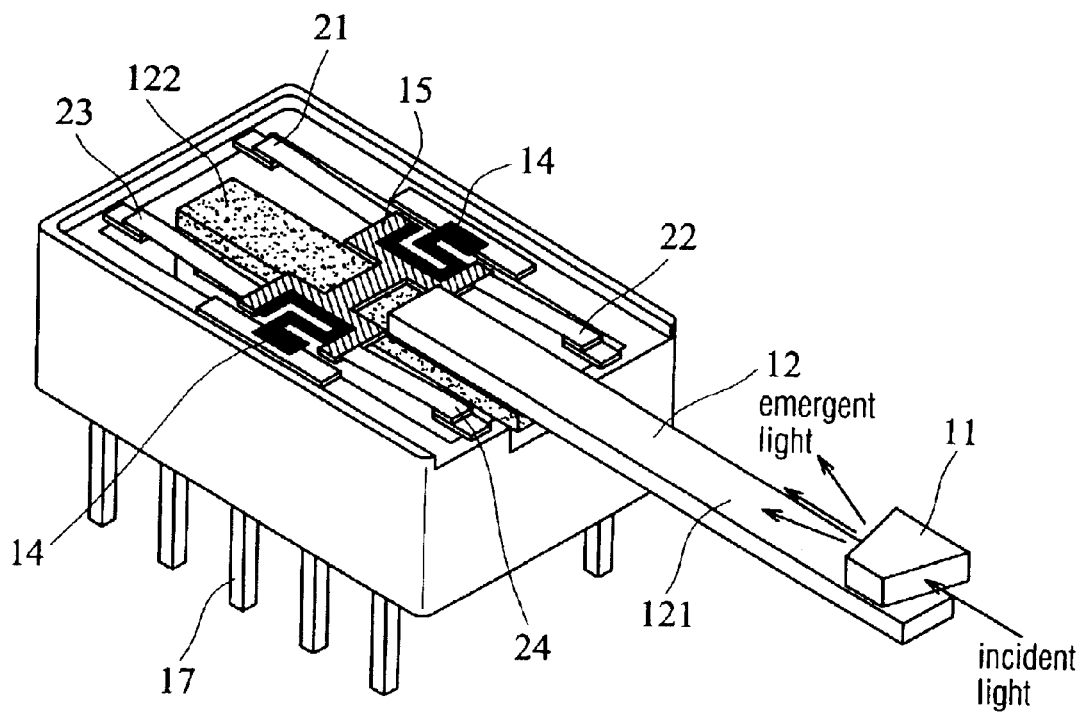
FIG. 1 is a schematic diagram of a conventional optical switch.
Figure 2:
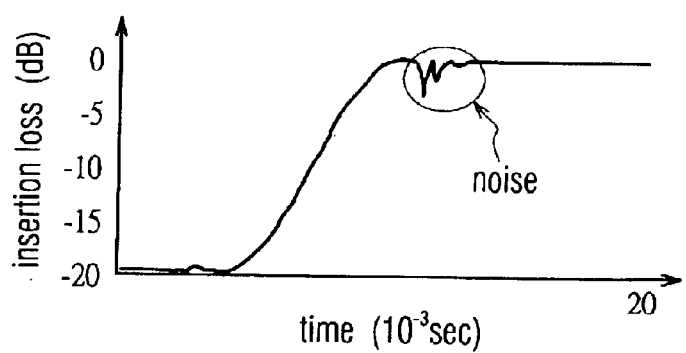
FIG. 2 is a diagram showing the signal output of a conventional optical switch.

The method for eliminating the noise of an optical switch according to an embodiment of the invention will be described below with reference to the drawings, wherein the same components will be explained by the same reference numerals.

Figure 3:
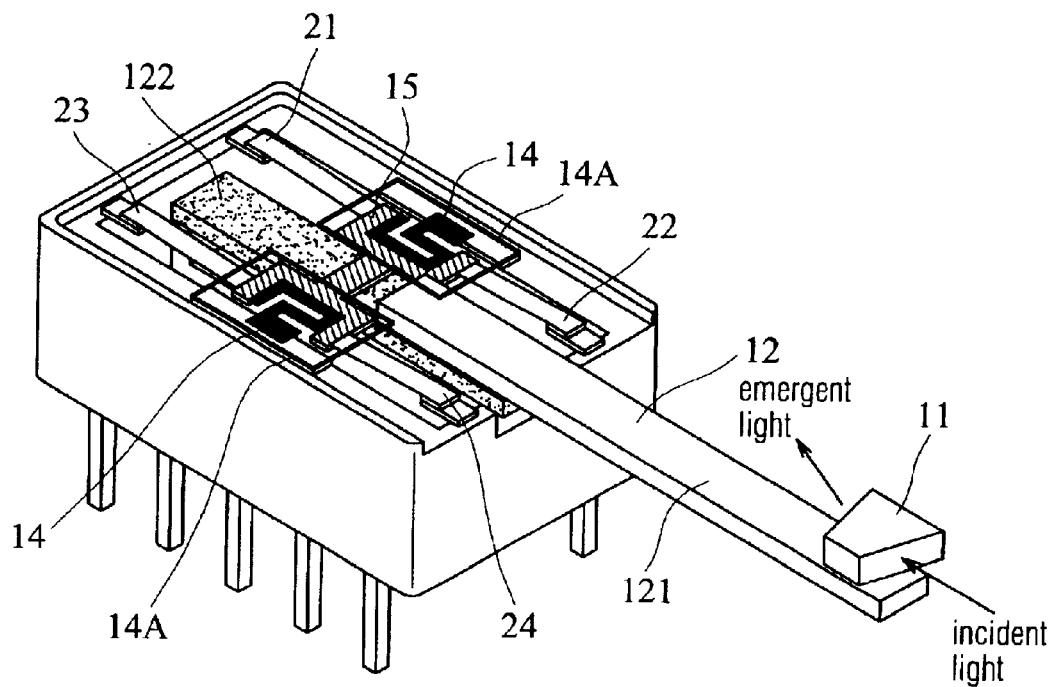
FIG. 3 is a schematic diagram showing an optical switch of the invention.

The method for eliminating the noise of an optical switch can be achieved by the device shown in FIG. 3. Referring to FIG. 3, an optical switch of the invention includes an optical component 11 for inputting/outputting light, a cantilever 12 which has a cantilever sheet 122 and an arm 121 for supporting the optical component 11 in inputting/outputting light so as to generate a phase conversion, a flexible coupler 14 which is either a metal sheet or a plastic sheet, and a joint 15 for connecting the cantilever 12 and the flexible coupler 14. The method for eliminating the noise of the optical switch is to perform a step of damping generation, that is, to apply a damping material 14A on the flexible coupler 14. The damping material 14A can be silica gel, gel or grease.

Figure 4:
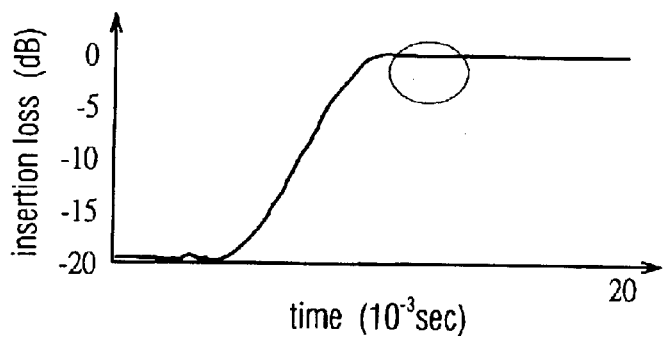
FIG. 4 is a diagram showing the signal output of an optical switch of the invention.

In particular, the step of damping generation is to apply a damping material 14A on the flexible coupler 14 so that the damping can be increased when the flexible coupler 14 is in motion, and the vibration generated by the cantilever 12, which is connected to the flexible coupler 14, can be eliminated when the cantilever 12 is making a phase conversion. Therefore, the noise of the optical switch can be eliminated, as shown in FIG. 4, so that the phase can avoid being misjudged and the life span of the relay can be prolonged. Specifically, the damping material 14A can be silica gel, gel or grease.

The embodiment above is only intended to illustrate the invention; it does not, however, to limit the invention to the specific embodiment. Accordingly, various modifications and changes may be made without departing from the spirit and scope of the invention as described in the appended claims.

What is claimed is:

1. A method for eliminating the noise of an optical switch, wherein the optical switch comprises a cantilever, a flexible coupler, and a joint, in which the joint is used to connect the cantilever and the flexible coupler, and to achieve the phase conversion by means of the cantilever, the method for eliminating the noise of an optical switch comprising:

damping generation, which is employed to eliminate the vibration of the optical switch by applying a damping material on the flexible coupler when the optical switch is performing a phase conversion.

2. The method for eliminating the noise of an optical switch as claimed in claim 1, wherein the cantilever is composed of a cantilever sheet and an arm.

3. The method for eliminating the noise of an optical switch as claimed in claim 1, wherein the flexible coupler is a metal sheet.

4. The method for eliminating the noise of an optical switch as claimed in claim 1, wherein the flexible coupler is a plastic sheet.

5. The method for eliminating the noise of an optical switch as claimed in claim 1, wherein the damping material comprises either one of the following: silica gel, gel or grease.

6. A method for eliminating the noise of an optical switch, wherein the optical switch comprises a cantilever, a flexible coupler, and a joint, in which the joint is used to connect the cantilever and the flexible coupler, and to achieve the phase conversion by means of the cantilever; besides, the method for eliminating the noise of an optical switch comprises:

damping generation that is used to eliminate the vibration of the cantilever by applying a damping material on the flexible coupler when the optical switch is performing a phase conversion.

7. The method for eliminating the noise of an optical switch as claimed in claim 6, wherein the cantilever is composed of a cantilever sheet and an arm.

8. The method for eliminating the noise of an optical switch as claimed in claim 6, wherein the flexible coupler is a metal sheet.

9. The method for eliminating the noise of an optical switch as claimed in claim 6, wherein the flexible coupler is a plastic sheet.

10. The method for eliminating the noise of an optical switch as claimed in claim 6, wherein the damping material comprises either one of the following: silica gel, gel or grease.

* * * * *